US005935712A

United States Patent [19]

Tan et al.

[11] Patent Number: 5,935,712

[45] Date of Patent: Aug. 10, 1999

[54] FUSER MEMBER WITH SURFACE TREATED $SNO_2$, CUO, OR MIXTURE FILLER

[75] Inventors: Biao Tan, Rochester; Jiann H. Chen, Fairport; Tonya D. Binga, Rochester; William J. Staudenmayer, Pittsford, all of N.Y.

[73] Assignee: Eastman Kodak Company, Rochester, N.Y.

[21] Appl. No.: 08/962,108

[22] Filed: Oct. 31, 1997

[51] Int. Cl.[6] .................................................... B32B 27/00

[52] U.S. Cl. ......................... 428/421; 428/689; 428/701; 428/702; 399/320; 399/333; 492/56

[58] Field of Search .................................... 428/421, 689, 428/701, 702; 399/320, 333; 492/56

[56] References Cited

U.S. PATENT DOCUMENTS

| | | | |
|---|---|---|---|
| 5,017,432 | 5/1991 | Eddy et al. | 428/422 |
| 5,269,740 | 12/1993 | Fitzgerald et al. | 492/56 |
| 5,292,562 | 3/1994 | Fitzgerald et al. | 428/35.8 |
| 5,292,606 | 3/1994 | Fitzgerald | 428/35.8 |
| 5,336,596 | 8/1994 | Bronstein et al. | 435/6 |
| 5,401,570 | 3/1995 | Heeks et al. | 428/332 |
| 5,464,698 | 11/1995 | Chen et al. | 428/421 |
| 5,480,724 | 1/1996 | Fitzgerald et al. | 428/447 |
| 5,595,823 | 1/1997 | Chen et al. | 428/421 |
| 5,851,673 | 12/1998 | Chen et al. | 428/421 |

*Primary Examiner*—Mark Chapman
*Attorney, Agent, or Firm*—Doreen M. Wells

[57] ABSTRACT

A fuser member having improved toner offset release and wear characteristics. The outermost layer comprises a fluoroelastomer with thermally conductive fillers which are surface treated with a coupling agent that is interactive with the fluoroelastomer and with a release agent which may, optionally, be used on the surface of the fluoroelastomer layer.

21 Claims, No Drawings

FUSER MEMBER WITH SURFACE TREATED $SnO_2$, CUO, OR MIXTURE FILLER

CROSS REFERENCE TO RELATED APPLICATIONS

This application is related to the following commonly owned U.S. applications filed on Oct. 31, 1997: U.S. Ser. No. 08/962,129 of Tan, Chen, Binga and Wilkins, titled FUSER MEMBER WITH SURFACE TREATED $Al_2O_3$ AND FUNCTIONALIZED RELEASE FLUIDS, and U.S. Ser. No. 08/961,838 of Tan, Chen, Binga and Wilkins, titled FUSER MEMBER WITH CHEMICALLY MODIFIED ELASTOMER/FILLERS AND FUNCTIONALIZED RELEASE FLUIDS.

FIELD OF THE INVENTION

This invention relates generally to heat fusing members and methods of making same. More particularly, it relates to an improved fuser roller surface that decreases toner offset and abrasion and increases toner release and thermal conductivity.

BACKGROUND OF THE INVENTION

In electrophotographic fuser systems, fuser roller overcoats are made with layers of polydimethylsiloxane (PDMS) elastomers, fluorocarbon resins and fluorocarbon elastomers. PDMS elastomers have low surface energy and relatively low mechanical strength, but is adequately flexible and elastic and can produce high quality fused images. After a period of use, however, the self-release property of the roller degrades and offset begins to occur. Application of a PDMS oil during use enhances the release property of the fuser roller surface but shortens roller life due to oil swelling. Fluorocarbon resins like polytetrafluoroethylene (PTFE) have good release property but less flexibility and elasticity than PDMS elastomers. Fluorocarbon elastomers, such as Viton™ and Fluorel™, are tough, flexible, resistant to high temperatures, durable and do not swell, but they have relatively high surface energy and poor thermal conductivity.

Particulate inorganic fillers have been added to fluorocarbon elastomers and silicone elastomers to increase mechanical strength and thermal conductivity. High thermal conductivity is an advantage because heat needs to be efficiently and quickly transmitted from an internally heated core to the outer surface of the fuser roller to fuse the toners and yield the desired toner images. However, incorporation of inorganic fillers to improve thermal conductivity has a major drawback: it increases the surface energy of fuser roller surface and also increases the interaction of the filler with the toner and receiver. After a period of use, the toner release properties of the roller degrade and toner offset begins to occur due to roller wear and weak interaction between the filler and the polymer matrix. It would be desirable to provide a fuser member having a fluorocarbon elastomer overcoat layer containing thermally conductive inorganic fillers, but which still has a moderately low surface energy and good toner release property. In addition, it should be compatible with the functionalized polymeric release agent employed during fixing process.

Fuser members of fluorocarbon elastomer containing inorganic filler are disclosed, for example, U.S. Pat. No. 5,464,698 to Chen et al. which describes fuser rollers having a surface layer comprising fluorocarbon elastomer and tin oxide fillers. The fillers provide active sites for reacting the mercapto-functional polydimethylsiloxane. However, the inorganic fillers are untreated and remain highly reactive with the toner and charge control agent, and this is undesirable.

U.S. Pat. No. 5,595,823 to Chen et al. describes fuser rollers having a surface layer comprising fluorocarbon elastomer and aluminum oxide fillers which also are untreated and are prone to high reactivity with toner and charge control agent which, again, is undesirable.

U.S. Pat. No. 5,017,432 to Eddy et al. describes a fluorocarbon elastomer fuser member which contains cupric oxide to interact with the polymeric release agent and provide an interfacial barrier layer.

Fuser members of condensation-crosslinked PDMS elastomers filled with metal oxides are disclosed, for example, in U.S. Pat. No. 5,401,570 to Heeks et al. This patent describes a silicone rubber fuser member containing aluminum oxide fillers which react with a silicone hydride release oil.

U.S. Pat. No. 5,480,724 to Fitzgerald et al. discloses tin oxide fillers which decrease fatigue and creep (or compression) of the PDMS rubber during continuous high temperature and high stress (i.e. pressure) conditions.

Some metal oxide filled condensation-cured PDMS elastomers are also disclosed in U.S. Pat. No. 5,269,740 (cupric oxide filler), U.S. Pat. No. 5,292,606 (zinc oxide filler), U.S. Pat. No. 5,292,562 (chromium oxide filler), and U.S. Pat. No. 5,336,596 (nickel oxide filler). All provide good results.

Unfortunately, as fuser rollers wear, the metal oxide fillers that are exposed react not only with the functionalized polymeric release agent, but also with the toner, paper substrate and charge control agent. Such reactions build up debris on the surface of the fuser roller, causing deterioration of toner release and great reduction in the life of the fuser roller. Thus, there remains a need for fuser members whose metal oxide fillers are made to enhance the interaction between elastomer and filler and also between the polymeric release agent and filler.

SUMMARY OF THE INVENTION

The present invention provides an effective way to solve the problems described above. By filling a fluorocarbon elastomer with metal oxide particles treated with a coupling agent, the present invention provides a fuser member with the desired thermal conductivity and toner release properties.

More particularly, the invention provides a fuser member comprising a support and coated thereon a fluoroelastomer layer comprising a metal oxide filler selected from tin oxide, cupric oxide, and mixtures thereof, said filler having been treated with a silane coupling agent.

The present invention also provides a method of making a fuser member comprising the steps of a) providing a cylindrical core; b) compounding a fluoroelastomer with a metal oxide filler selected from tin oxide, cupric oxide, and mixtures thereof, the filler having been treated with a silane coupling agent; c) coating the fluoroelastomer on the cylindrical core; and d) curing the fuser member.

Metal oxide fillers which have been thus modified can interact with fluorocarbon polymers and bond with them. Such fillers also help to wet the surface and thereby facilitate compounding. The fuser member of the invention greatly improves fuser/toner release, toner offset on the roller surface and decreases abrasion of the fuser member overcoat.

The invention provides an effective, durable fuser roller and high quality copies at high speed.

The toner/fuser release can be further improved by applying to the outermost layer of the fuser member an effective amount of a polymethyldisiloxane (PDMS) release agent that, optionally, includes at least one functional group reactive with the fluoroelastomer, followed by incubation at an elevated temperature. While not wishing to be bound by the proposed theory, it is believed that the functional groups on the coupling agent bring about an interaction between filler and release fluid, thereby forming a protective layer between toner and filler.

An additional advantage is that this invention allows for a high percentage of metal oxide fillers in the fluoroelastomer and therefore high thermal conductivity can be achieved. At the same time, critical fuser properties such as release and wear are not sacrificed.

DETAILED DESCRIPTION OF THE INVENTION

The fluorocarbon elastomers used in the invention were prepared according to the method described in commonly owned U.S. Ser. No. 08/805,479 of Chen et al. filed Feb. 25, 1997, titled TONER FUSER MEMBER HAVING A METAL OXIDE FILLED FLUOROELASTOMER OUTER LAYER WITH IMPROVED TONER RELEASE as follows.

In the fuser member of the present invention, the outermost layer comprises a cured fluoroelastomer, preferably a terpolymer of vinylidene fluoride (VF), tetrafluoroethylene (TFE), and hexafluoropropylene (HFP), that includes at least about 21 mole percent HFP and, preferably, at least about 50 mole percent VF. Among commercially available fluoroelastomers, Viton™ materials, obtainable from DuPont, are frequently employed for the fabrication of fuser members. These materials include Viton™ A, containing 25 mole percent HFP; Viton™ E45, containing 23 mole percent HFP; and Viton™ GF, containing 34 mole percent HFP.

A preferred fluoroelastomer for the outermost layer of the fuser member of the present invention is Fluorel™ FX-9038, available from 3M, containing 52 mole percent VF, 34 mole percent TFE, and 14 mole percent HFP. More preferred is Fluorel™ FE-5840Q, also available from 3M, containing 53 mole percent VF, 26 mole percent TFE, and 21 mole percent HFP.

At least 10 parts by weight of metal oxide per 100 parts by weight of cured fluoroelastomer are included in the outermost layer of the fuser member. The metal oxide may be cupric oxide, tin oxide, or mixtures thereof. In a preferred embodiment, 10 to 50 parts of cupric oxide are included in the outermost layer. Alumina may also be included as a thermally conductive filler in the layer; in one embodiment, 120 parts per 100 parts (by weight) of fluoroelastomer are incorporated.

The preferred silane coupling has the general structure:

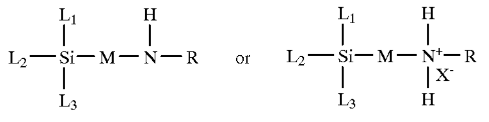

wherein

M=aliphatic or aromatic chain with C atom numbers vary from 0–20.

R=proton, phenyl or alkyl, etc.

$L_1$, $L_2$, $L_3$=Alkoxy, alkyl, halide, etc. with C atom numbers vary from 0–10 and at least one of the L should be alkoxy or halide.

X=negative counter ion, e.g. chloride ion, bromide ion, etc.

Suitable coupling agents are 3-aminopropyltrimethoxysilane, 3-aminopropyltriethoxysilane, N-phenylaminopropyltrimethoxysilane, (aminoethylaminomethyl)phenethyltrimethoxysilane, aminophenyltrimethoxysilane, 3-aminopropyldimethoxysilane, 3-aminopropylmethyldiethoxysilane, 3-(2-aminoethylamino)propyltrimethoxysilane, 3-(2-N-benzylaminoethylaminopropyl)trimethoxysilane hydrochloride, etc.

Although the fuser member of the invention, wherein the metal oxide particles have been treated with a coupling agent, exhibits generally good toner offset and release characteristics, these properties may be improved by applying a polydimethylsiloxane (PDMS) release agent to the outermost layer and incubating the fuser member to form a surface that displays enhanced toner release. Preferred PDMS release agents, which include a functional group that is reactive with the fluoroelastomer, have the formula

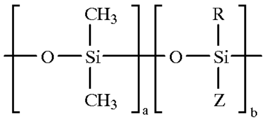

where R is alkyl or aryl, Z is selected from the group consisting of hydrogen, aminoalkyl containing up to about 8 carbon atoms, and mercaptoalkyl containing up to about 8 carbon atoms, and the ratio of a:b is about 1:1 to 3000:1. In more preferred embodiments, Z is hydrogen, aminopropyl, or mercaptopropyl. In a particularly preferred embodiment, Z is hydrogen and the a:b ratio is about 10:1 to 200:1. In another particularly preferred embodiment, Z is aminopropyl and the a:b ratio is about 200:1 to 2,000:1.

An example of a hydrogen-functionalized PDMS release agent is EK/PS-124.5 (available from United Chemical), which contains 7.5 mole percent of the functionalized component and has a viscosity of 225 centistokes. Xerox amino-functionalized PDMS 8R3995 fuser agent II contains 0.055 mole percent of an aminopropyl-substituted component and has a viscosity of 300 centistokes. Xerox mercapto-functionalized PDMS 8R2955 contains 0.26 mole percent of a mercaptopropyl-substituted component and has a viscosity of 275 centistokes. A non-functionalized PDMS release oil, DC-200 (from Dow Coming), is useful for purposes of comparison with the functionalized agents and has a viscosity of 350 centistokes.

Materials

Fluorel™ FE Fluoroelastomer 5840Q, ter-polymer of vinylidene fluoride, hexafluoropropylene and tetrafluoroethylene (FE5840Q)—3M, Co.

MgO (Maglite™ D)—Merck/Calgon Corp.

$Ca(OH)_2$—Aldrich®

$SnO_2$ (CS3)—Magnesium Electron, Inc.

CuO—J. T. Baker®

3-Aminopropyltriethoxylsilane (NCR)—PCR®

The invention is further illustrated by the following examples and comparative examples.

EXAMPLE 1 (E-1)

Treatment of Filler Surface with Coupling Reagent Solution

Treatment solution was freshly prepared by adding aminopropyltriethoxylsilane (2wt. %) to $EtOH/H_2O$ (95/5 by vol.) solvent and stirred for 10 minutes. Fillers ($SnO_2$ or CuO or mixtures thereof) were covered by solution and stirred in ultrasonic bath for 10 minutes. Fillers were then washed twice with EtOH and dried under reduced pressure (under vacuum) at 150° C. for 30 minutes and at room temperature overnight.

Compounding

Fluorel™ FE5840Q (100 gm), MgO (3 gm), Ca(OH)2 (6 gm) and surface treated $SnO_2$—(138 gm) and CuO (50 gm)—were thoroughly compounded in a two roll mill with water cooling at 63° F. (17° C.) until a uniform, dry composite sheet was obtained.

Preparation of a Compression Mold Slab

The fluoroelastomer-treated fillers gum obtained as described above was compression molded into 75-mil plaques, with curing for 20 minutes at 350° F. (177° C.) under 45 tons pressure and post-curing for 48 hours at 450° F. (232° C.). The plaques were employed in tests to evaluate the toner offset and release characteristics, wear and thermal conductivity as described below and results are indicated in Table 1.

COMPARATIVE EXAMPLE 1 (C-1)

Substantially the same procedure as in Example 1, except that the SnO2 and CuO fillers were not surface treated and the results are indicated in Table 1.

COMPARATIVE EXAMPLE 2 (C-2)

Substantially the same procedure as in Example 1, except that the 138 parts SnO2 and 10 parts CuO fillers were not surface treated. The results are indicated in Table 1.

Test Methods for Results in Table 1

The four tests described immediately below were conducted using the plaques of Example 1 above. Results appear in Table 1.

Toner Offset and Release Measurement

These procedures are described in U.S. Ser. No. 08/805,479 of Chen et al. filed Feb. 25, 1997, titled TONER FUSER MEMBER HAVING A METAL OXIDE FILLED FLUOROELASTOMER OUTER LAYER WITH IMPROVED TONER RELEASE as follows.

The test plaques obtained as described above are employed to evaluate the toner offset and release force characteristics of the outermost layer of the fuser members. A plaque is cut into 1-inch (2.56-cm) squares. One of these squares is left untreated by release agent. To the surface of each of four squares is applied in unmeasured amount, one of the previously mentioned PDMS release oils: non-functionalized release oil DC-200 (PDMS); hydrogen-functionalized oil EK/PA-124.5 (PDMS-H); Xerox amino-functionalized PDMS 8R79 (PDMS-$NH_2$); and Xerox mercapto-functionalized PDMS 8R2955 (PDMS-SH).

Each sample was incubated overnight at a temperature of 175° C. Following this treatment, the surface of each sample was wiped with dichloromethane. Each sample was then soaked in dichloromethane for one hour and allowed to dry before off-line testing for toner offset and release properties.

Each sample, including those untreated with release agent, was tested in the following manner:

A 1-inch (2.56-cm) square of paper covered with unfused styrene-butyl acrylate toner was placed in contact with a sample on a bed heated to 175° C., and a pressure roller set for 80 psi was locked in place over the laminate to form a nip. After 20 minutes the roller was released from the laminate.

The extent of offset for each sample was determined by micro-sample surface following delamination. The following numerical evaluation, corresponding to the amount of toner remaining on the surface, was employed.

| | |
|---|---|
| 1 | 0% offset |
| 2 | 1–20% offset |
| 3 | 21–50% offset |
| 4 | 51–90% offset |
| 5 | 91–100% offset |

Qualitative assessment of the force required for delamination of the paper from the sample is as follows:

| | |
|---|---|
| 1 | low release force |
| 2 | moderate release force |
| 3 | high release force |

Wear Measurement

A piece of plaque 9/16"×2" was cut for the wear test. A Norman abrader (by Norman Tool, Inc.) was used, and the temperature was set at 350° F. The speed was set at ~30 cycles/minute and the load was set at 984 g.

Four rolls of paper were run on the plaque sample for 480 cycles each and the wear tracks were measured for depth by a surfanalyzer. The average of the four tracks was reported in mils.

Thermal Conductivity Measurement

A round piece of plaque 5 cm diameter was cut for the test. Thermal conductivity was measured by Holometrix™ TCA-100 Thermal Conductivity Analyzer. Reported values (BTU/hr-ft-°F.) were from two stacks of samples.

Surface Energy Analysis

Surface Energy was measured by AST products VCA-2500XE Surface energy analyzer. Polar and dispersive forces were measured using water and diiodomethane, respectively. The total force (dynes/$cm^2$) was reported.

TABLE 1

| | FE5840Q 100 pt with MgO/Ca(OH)2(3:6) | | |
|---|---|---|---|
| Sample ID | C-2 | C-1 | E-1 |
| Fillers | SnO2, 138 pt CuO, 10 pt | SnO2, 138 pt CuO, 50 pt | SnO2, 138 pt CuO, 50 pt (both treated with NCR) |
| Offset/Release: | | | |
| PDMS-NH2 | 1/2 | 1/1 | 1/1 |
| PDMS-H | 1/2 | 2/2 | 1/1 |
| PDMS-SH | 2/2 | 2/2 | 1/1 |
| PDMS | 1/3 | 2/2 | 1/2 |
| No oil | 2/3 | 4/3 | 4/3 |
| Wear | | 2.8 | 2.0 |
| Surface Energy | 38.0 | 28.6 | 23.9 |
| Thermal Conductivity | 0.22 | 0.26 | 0.29 |

NCR — 3-Aminopropyltriethoxysilane

The results show that wear and surface energy were significantly better for the sample with treated filler than for the sample with untreated filler.

The invention has been described in detail with particular reference to certain preferred embodiments thereof, but it will be understood that variations and modifications can be effected within the spirit and scope of the invention.

What is claimed is:

1. A fuser member comprising a support and coated thereon a fluoroelastomer layer comprising a metal oxide filler selected from tin oxide, cupric oxide, and mixtures thereof, said filler having been treated with a silane coupling agent.

2. The fuser member of claim 1 wherein the fluoroelastomer comprises:

$—(CH_2CF_2)_x$;

$—(CF_2CF_2)_y$; and

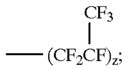

where x is from 30 to 90 mole percent, y is from 10 to 70 mole percent, and z is from 0 to 30 mole percent.

3. The fuser member of claim 2, wherein x is 52 mole percent, y is 34 mole percent, and z is 14 mole percent.

4. The fuser member of claim 2, wherein x is 53 mole percent, y is 26 mole percent, and z is 21 mole percent.

5. The fuser member of claim 1 wherein the tin oxide is 30 to 280 parts by weight per 100 parts by weight of the fluoroelastomer.

6. The fuser member of claim 1 wherein the cupric oxide is 10 to 50 parts by weight per 100 parts by weight of the fluoroelastomer.

7. The fuser member of claim 1 wherein the silane coupling agent has the structure:

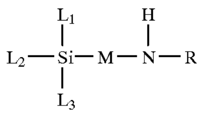
or
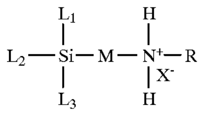

wherein

M-aliphatic or aromatic chain with C atom numbers vary from 0–20.

R-proton, phenyl or alkyl, etc.

L1, L2, L3-Alkoxy, alkyl, halide, etc. with C atom numbers vary from 0–10 and at least one of the L should be alkoxy or halide;

X—negative counter ion, e.g. chloride ion, bromide ion, etc.

8. The fuser member of claim 7 wherein the silane coupling agent comprises a functional group selected from alkoxy and halide.

9. The fuser member of claim 7 wherein the silane coupling agent is selected from the group consisting of aminopropyl triethoxysilane, aminopropyl dimethoxyethoxysilane, and N-(2-Aminoethyl-3-aminopropyl trimethoxysilane.

10. A fuser member comprising:

a support;

a base cushion layer; and a fluoroelastomer layer comprising a metal oxide filler selected from tin oxide, cupric oxide, and mixtures thereof, said filler having been treated with a silane coupling agent having a reactive functional group.

11. The fuser member of claim 10 wherein the base cushion layer comprises silicone rubber.

12. The fuser member of claim 10 wherein the base cushion layer contains a thermally conductive filler.

13. The fuser member of claim 10 further comprising an adhesion layer between the base cushion layer and the fluoroelastomer layer.

14. The fuser member of claim 1 or 2, further having a polydimethylsiloxane release agent applied to the fluoroelastomer layer in an amount sufficient to produce, upon incubation at elevated temperature, a surface having improved toner release properties on said outermost layer.

15. The fuser member of claim 14 wherein the polydimethylsiloxane release agent comprises an aminoalkyl functional group reactive with the fluoroelastomer.

16. The fuser member of claim 14 wherein the polydimethylsiloxane release agent comprises a functional group interactive with the silane coupling agent.

17. The toner fuser member of claim 14 wherein the polydimethylsiloxane release agent has the formula

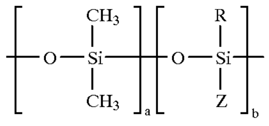

where R is alkyl or aryl, Z is selected from the group consisting of hydrogen, aminoalkyl containing up to about 8 carbon atoms, and mercaptoalkyl containing up to about 8 carbon atoms, and the ratio of a:b is about 1:1 to 3000:1. In more preferred embodiments, Z is hydrogen, aminopropyl, or mercaptopropyl. In a particularly preferred embodiment, Z is hydrogen and the a:b ratio is about 10:1 to 200:1. In another particularly preferred embodiment, Z is aminopropyl and the a:b ratio is about 200:1 to 2,000:1.

18. The toner fuser member of claim 17 wherein Z is aminopropyl or hydrogen.

19. A method of making a fuser member comprising the steps of a) providing a cylindrical core;

b) compounding a fluoroelastomer with a metal oxide filler selected from tin oxide, cupric oxide, and mixtures thereof, the filler having been treated with a silane coupling agent;

c) coating the fluoroelastomer on the cylindrical core; and d) curing the fuser member.

20. The method of claim 19 wherein a base cushion layer is deposited on the core prior to step c).

21. The method of claim 19, further comprising the step of coating an adhesion layer on the base cushion layer prior to step c).

* * * * *